(12) United States Patent
Simms

(10) Patent No.: US 9,385,638 B2
(45) Date of Patent: Jul. 5, 2016

(54) REGENERATIVE RECTIFIER FOR A MOTOR CONTROL DRIVE

(71) Applicant: EATON CORPORATION, Cleveland, OH (US)

(72) Inventor: Stan Rex Simms, Arden, NC (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/527,876

(22) Filed: Oct. 30, 2014

(65) Prior Publication Data

US 2016/0126869 A1    May 5, 2016

(51) Int. Cl.
*H02P 1/24*    (2006.01)
*H02P 3/14*    (2006.01)

(52) U.S. Cl.
CPC ........................................ *H02P 3/14* (2013.01)

(58) Field of Classification Search
CPC ........... H02P 9/30; H02J 1/14; G01R 19/2513
See application file for complete search history.

(56) References Cited

U.S. PATENT DOCUMENTS

| | | |
|---|---|---|
| 5,910,892 A | 6/1999 | Lyons et al. |
| 6,166,153 A | 12/2000 | Shamshoum et al. |
| 6,542,390 B2 | 4/2003 | Bixel |
| 6,693,813 B2 | 2/2004 | Kolar et al. |
| 6,847,531 B2 | 1/2005 | Bixel |
| 7,102,333 B2 | 9/2006 | Komulainen |
| 7,170,767 B2 | 1/2007 | Bixel |
| 7,414,866 B2 | 8/2008 | Zhang |
| 7,508,147 B2 | 3/2009 | Rastogi et al. |
| 7,902,779 B2 | 3/2011 | Bousfield, III et al. |
| 7,940,537 B2 | 5/2011 | Abolhassani et al. |
| 8,188,693 B2 | 5/2012 | Wei et al. |
| 8,213,198 B2 | 7/2012 | Abolhassani et al. |
| 2007/0005194 A1* | 1/2007 | Chang ................ G01R 19/2513 700/292 |
| 2010/0008118 A1 | 1/2010 | Becker et al. |
| 2012/0242261 A1 | 9/2012 | Curiac |
| 2014/0254225 A1 | 9/2014 | Nieberlein |

OTHER PUBLICATIONS

Rodriguez, et al., PWM Regenerative Rectifiers: State of the Art, pp. 1-15.
Mitsubishi Electric: Medium Voltage Inverter, PMT-F500MV Series, pp. 1-6.
Reference Story, Vacon AC Drives Save Energy in Sugar Centrifuge Applications, 2 pgs.

(Continued)

*Primary Examiner* — Karen Masih
(74) *Attorney, Agent, or Firm* — Eckert Seamans Cherin & Mellott, LLC; Philip E. Levy

(57) ABSTRACT

A system, and associated method, for controlling a motor drive coupled to an AC power source in a condition wherein the motor drive is generating a regenerative current. The system includes a plurality of electronic switching devices structured to be provided in anti-parallel connection with a plurality of rectifier diodes of the motor drive, and a controller structured and configured to receive a number of phase voltages from the AC power source, determine a grid angle for the AC power source using the number of phase voltages, and generate a number of control signals for controlling the electronic switching devices using the grid angle when the motor drive is generating the regenerative current.

15 Claims, 4 Drawing Sheets

(56) References Cited

OTHER PUBLICATIONS

Eaton Powering Business Worldwide: SC9000 EP, Medium Voltage Adjustable Frequency Drive, Reliable Design and Construction You've Come to Expect; Publication No. BR02003004E / Z15341; Jun. 2014; pp. 1-12.

Yaskawa: High Performance Line Regeneration, RC5 Converter, YEA Document No. FL.RC5.01, Dec. 1, 2006; pp. 1-2.

Sayed-Ahmed, et al., Industrial Regenerative Motor-Drive Systems, 978-1-4577-1216-6/12, IEEE, pp. 1555-1561.

Rodriguez, et al., PWM Regenerative Rectifiers: State of the Art, pp. 1-15, Feb. 7, 2005.

Mitsubishi Electric: Medium Voltage Inverter, PMT-F500MV Series, pp. 1-6, Nov. 2002.

Rockwell Automation: Reliance Electric, D-7166, May 1995, pp. 1-9.

Kolar et al., Design and Experimental Evaluation of the Loss-Free Braking Resistor Concept for Applications in Integrated Converter Machine Systems, 0-7803-4503-7/98, 1998 IEEE, pp. 626-629.

Kolar et al., A Novel Concept for Regenerative Braking of PWM-VSI Drives Employing a Loss-Free Braking Resistor, O-7803-3704-2/97, 1997 IEEE, pp. 297-305.

Innovation Series, Medium Voltage AC Drives, 2300 V., 18-Pulse Non-regenerative Drive, User's Manual (Preliminary Copy), Publication GEK-105490, Nov. 24, 1997, pp. 1-76.

Blasko, V., Power Conditions and Control of a Regenerative Brake, 0-7803-4943-1/98, 1998, IEEE, pp. 1504-1510.

Zhang, et al., A Novel Method to Mitigate Commutation Failures in HVDC Systems, pp. 1-6, Oct. 2002.

Nabae et al., A New Neutral-Point-Clamped PWM Inverter, IEEE, Transactions on Industry Applications., vol. 1A-17, Sep./Oct. 1981, pp. 518-523.

POWEREX, PD41_10, POW-R-BLOK, Dual Diode Isolated Module 1000 Amperes/Up to 4000 Volts, Mar. 22, 2007.

POWEREX, LD81_45, POW-R-BLOK, Dual Diode Isolated Module 450 Amperes/Up to 4000 Volts, Dec. 10, 2008.

POWEREX, QIS4506001 Preliminary, Single Discrete IGBT 60 Amperes/4500 Volts, Jan. 2010, pp. 1-3.

POWEREX, QIS4506002 Preliminary, HV Single Discrete IGBT, 60 Amperes/4500 Volts, Jan. 2010, pp. 1-3.

IXYS, Very High Voltage IGBT, IXEL40N400, DS99385B (Sep. 2012).

IXYS, High Voltage IGBT for Capacitor Discharge Applications, IXGF30N400, DS99978C (Nov. 2009).

European Patent Office, "International Search Report and Written Opinion" (for corresponding application PCT/US2015/054360), Mar. 1, 2016, 12 pp.

H. Zhu et al., "Grid Synchronization Control without AC Voltage Sensors", APEC 2003, 18th Annual IEEE Applied Power Electronics Conference and Exposition, Miami Beach, FL, Feb. 9-13, 2003; [Annual Applied Power Electronics conference], New York, NY; IEEE, US, Feb. 9, 2003, pp. 172-178, vol. 1, XP032155897, DOI: 10.1109/APEC.2003.1179210 ISBN: 978-0-7803-7768-4, pp. 172, 173.

* cited by examiner

REGENERATIVE RECTIFIER FOR A MOTOR CONTROL DRIVE

BACKGROUND

1. Field

The disclosed concept pertains generally to motor control drives, and, more particularly, to a motor control drive that includes a regenerative front end.

2. Background Information

There are numerous settings wherein motors are employed to drive heavy machinery. For example, multiple high horsepower electric motors are used in a pumping system, such as, without limitation, a water pumping system. As is known in the art, in such settings, there are a number of devices that can be used to control the motors. In particular, contactors, soft starters, and variable frequency drives (VFDs) (also referred to as adjustable frequency drives or AFDs) are different types of devices that can be used to control a motor in such a setting.

A contactor simply connects the motor directly across the AC line. A motor connected to the AC line will accelerate very quickly to full speed and draw a large amount of current during acceleration. Thus, use of a contactor only to control a motor has many drawbacks, and in many industrial settings will not be permitted by the electric utility.

A soft starter is a device used to slowly ramp up a motor to full speed, and/or slowly ramp down the motor to a stop. Reducing both current draw and the mechanical strain on the system are big advantages of using a soft starter in place of a contactor. Soft starters are more common on larger horsepower systems.

A VFD is a solid state electronic power converting device used for controlling the rotational speed of an alternating current (AC) electrical motor by controlling the frequency of the electrical power supplied to the motor. Typically, a VFD first converts an AC input power to a DC intermediate power using a rectifier circuit. The DC intermediate power is then converted to a quasi-sinusoidal AC power using an inverter switching circuit. A VFD not only has the ramping ability of a soft starter, but also allows the speed to be varied while at the same time offering more flexibility and features.

When the rotor of an AC motor turns more slowly than the speed set by the applied frequency from, for example, a VFD, the motor is in a condition referred to as "motoring" wherein the motor transforms electrical energy into mechanical energy at the motor shaft. In contrast, when the rotor turns faster than the speed set by the applied frequency, the motor is in a condition referred to as "regeneration" wherein the motor acts like a generator and transforms mechanical energy from the motor shaft into electrical energy. Regeneration conditions may be caused by, for example and without limitation, an overhauling load, a reduction in commanded speed, or a ramp to stop. For a VFD and motor in a regenerative condition, the AC power from the motor (i.e., the regenerative current) from the motor flows back into the VFD. In most instances, the rectifier front end of a VFD only permits current to flow in the motoring direction. As a result, regeneration will cause the charge on the DC bus capacitors of the VFD to increase and will therefore cause the DC bus voltage to rise. Unless this back flow of regenerative current is addressed, the VFD will protect itself by initiating a high DC bus voltage trip.

There are three main ways to handle such regenerative energy in order to avoid a high DC bus voltage trip. In one method, the regenerative energy is released in the form of heat through a voltage regulated switching transistor and resistor, often called a "chopper," a "snubber" or a "dynamic brake." In another method, the DC buses of several drives are tied together such that the regenerative energy from one VFD/motor can be absorbed and used by another VFD/motor on the same DC bus. In the third method, a regenerative rectifier or regenerative bridge converter (often referred to as a regenerative front end) is provided in the drive and converts the regenerative energy on the DC bus into AC energy that may be provided back to the utility power grid.

One known and currently available VFD is the SC9000 motor drive sold by Eaton Corporation, the assignee of the present invention. The SC9000 includes a multi-pulse diode rectifier having four AC to DC rectifier bridges on the secondary of a phase shifting isolation transformer. The bridges are arranged in series connection creating two twelve pulse rectifiers which result in twenty four pulse harmonic mitigation on the primary of the transformer. The rectifiers are constructed with line frequency general purpose puck/capsule diodes fixed in a baseplate module. Since the rectifier is single way, the power from the drive is limited primarily in the motoring direction in either forward or reverse speed (i.e. two quadrant). When the sum product of torque speed is negative, power flows back into the drive (i.e., a regeneration condition exists) and increases the voltage on the split DC capacitor bank. In this scenario, the drive's SPX speed/current loop controls go into over-voltage limit and the deceleration plus regeneration is fairly limited. This regenerative torque/power is constrained to the losses of the rotating machine and inverter conduction/switching and DC bus discharge resistor losses. This amounts to less than 2-3% of rated power at full speed.

It would be advantageous to be able to provide a regenerative bi-directional fundamental front end (FFE) input power stage for the SC 9000 and similar drives that works in parallel with the existing line frequency diode modules and that allows power to flow to and from the machine so that it can both motor and generate on deceleration or overhauling loads.

SUMMARY

In one embodiment, a system is provided for controlling a motor drive coupled to an AC power source in a condition wherein the motor drive is generating a regenerative current. The system includes a plurality of electronic switching devices structured to be provided in anti-parallel connection with a plurality of rectifier diodes of the motor drive, and a controller structured and configured to receive a number of phase voltages from the AC power source, determine a grid angle for the AC power source using the number of phase voltages, and generate a number of control signals for controlling the electronic switching devices using the grid angle when the motor drive is generating the regenerative current.

In another embodiment, a regenerative variable frequency drive structured to be coupled to an AC power source is provided. The regenerative variable frequency drive includes a plurality of rectifier diodes, a plurality of electronic switching devices provided in anti-parallel connection with the plurality of rectifier diodes, and a controller (20). The controller is structured and configured to receive a number of phase voltages from the AC power source, determine a grid angle for the AC power source using the number of phase voltages, and generate a number of control signals for controlling the electronic switching devices using the grid angle when the motor drive is generating a regenerative current.

In still another embodiment, method is provided for controlling a motor drive coupled to an AC power source in a condition wherein the motor drive is generating a regenerative current. The method includes receiving a number of phase voltages from the AC power source, determining a grid angle for the AC power source using the number of phase voltages, and generating a number of control signals for controlling a plurality of electronic switching devices provided in anti-parallel connection with a plurality of rectifier diodes of the motor drive using the grid angle when the motor drive is generating the regenerative current.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
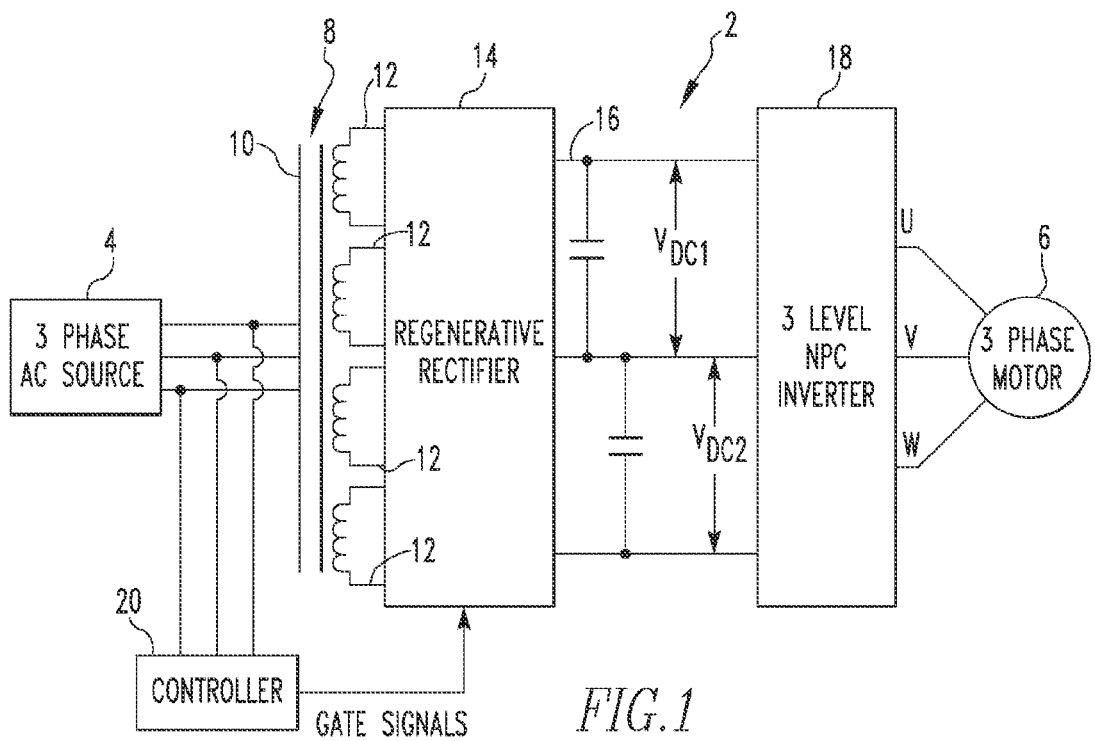
FIG. 1 is a schematic diagram of a variable frequency drive according to an exemplary embodiment of the present invention.

Directional phrases used herein, such as, for example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

As employed herein, the statement that two or more parts are "coupled" together shall mean that the parts are joined together either directly or joined through one or more intermediate parts.

As used herein, the terms "module", "component" and/or "system" are intended to refer to a computer related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As described in greater detail herein, the disclosed concept provides a regenerative front end for a variable frequency drive that includes a front-end AC to DC converter in the form of a multi-pulse diode rectifier that employs a number of pulse diode bridges. In the illustrated exemplary embodiment, the converter is a twenty four pulse diode rectifier having four series bridges that feed a split DC bus capacitor followed by a multi-level inverter, although it will be understood that different pulse configurations other than a twenty-four pulse configuration may also be employed. According to the disclosed concept, and as described in greater detail herein, twenty-four transistors are placed in antiparallel connection with the line frequency diode rectifiers. A control method is utilized that senses the power delivery system input voltage and performs a synchronous reference frame transformation producing the repeating grid angle. This grid angle is then passed onto four summing circuits which add/subtract the necessary lead/lag angle of the secondary phase-shifting group in correlation with the winding arrangements and transformer data. The output of each of these four summers is then passed into another synchronous reference frame transformation producing reference voltages for each secondary. The reference voltages are then treated with combinational logic and comparators to produce gating signals during regeneration. A pulse-stretcher circuit creates the necessary commutation overlap to prevent nuisance voltage notching. The information from the first transformation, namely the d and q values, are used in combination with other drive controller signals including DC bus voltage and actual motor power to limit how much power is processed back to the utility. A DC bus comparison is made to a hysteresis ON and OFF voltage through an SR-Flip Flop to enable the regeneration. These thresholds can be changed dynamically to compensate for how much power is processed.

The regenerative front end of the present invention may be provided as part of a complete motor drive solution that is provided as a unit. Alternatively, regenerative front end of the present invention may be provided as an add-on module fitted in parallel with the existing line frequency diode modules of a drive, perhaps mounted in an encapsulated printed circuit board (PCB) configuration.

FIG. 1 is a schematic diagram of a variable frequency drive 2 according to an exemplary embodiment of the present invention. Variable frequency drive 2 is a regenerative motor drive and is shown in FIG. 1 as being provided between a three phase AC source 4, which may be the utility grid, and a three phase motor 6. Variable frequency drive 2 includes a three-phase transformer 8 having a primary winding 10 and a number of secondary windings 12. As seen in FIG. 1, a regenerative rectifier 14 is coupled to secondary windings 12 and receives the three-phase AC output thereof. Regenerative rectifier 14, in one aspect, converts the three-phase AC output received on the secondary windings 12 to DC power. In addition, as described in detail elsewhere herein, regenerative rectifier 14 also, during a regeneration condition, converts the regenerative current produced in variable frequency drive 2 from DC power to AC power and provides the resulting AC power to transformer 8, which then provides that AC current to three-phase AC source 4.

The output of regenerative rectifier 14 is coupled to a DC link 16 (sometimes also referred to as a DC bus). DC link 16 is coupled to the input of an inverter 18. In the exemplary embodiment, inverter 18 is a three level NPC inverter, although it will be understood that other suitable inverter topologies may also be used. As is known in the art, inverter 18 converts the DC power on DC link 16 to three phase quasi-sinusoidal AC power (see phases U, V, W in FIG. 1) which is provided to three-phase motor 6.

As seen in FIG. 1, variable frequency drive 2 further includes a controller 20 that receives the upstream three-phase AC voltages from three-phase AC source 4 and, as described in detail herein, produces certain signals for controlling regenerative rectifier 14 during a regeneration condition. Controller 20 may be any type of suitable processing or control unit, such as, without limitation, a microprocessor, a microcontroller or a programmable logic controller (PLC), that is structured and configured (e.g., via appropriate programming) to function as described herein.

Figure 2:
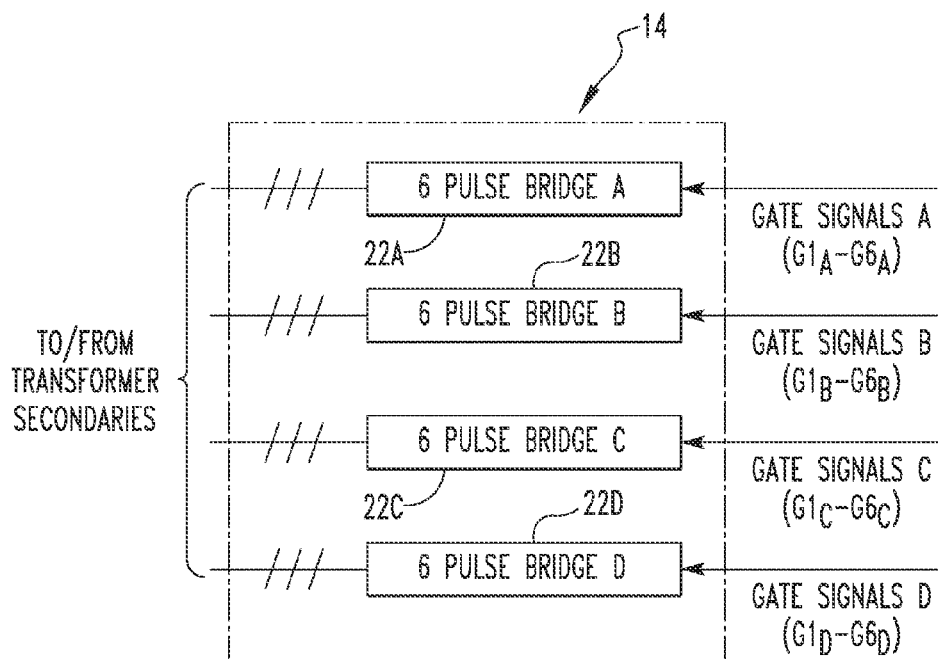
FIG. 2 is a schematic diagram of regenerative rectifier according to an exemplary embodiment of the present invention.
Figure 3:
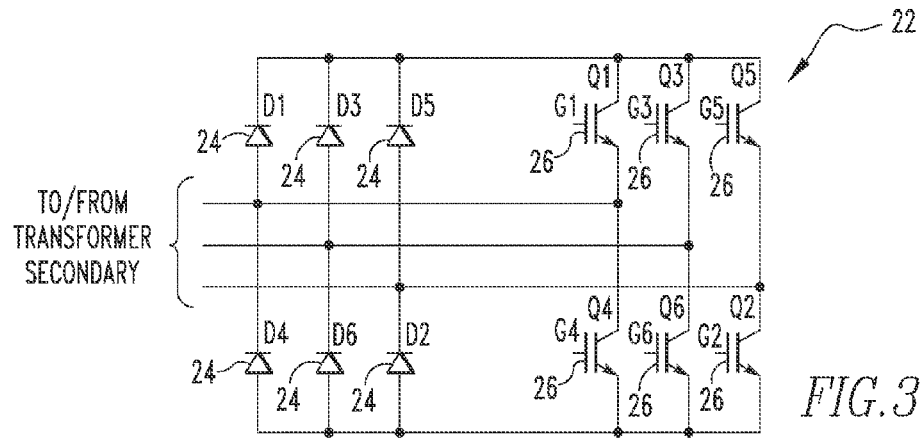
FIG. 3 is a schematic diagram of a diode bridge forming a part of the regenerative rectifier of FIG. 2 according to the exemplary embodiment.

FIG. 2 is a schematic diagram of regenerative rectifier 14 according to the exemplary embodiment. As seen in FIG. 2, regenerative rectifier 14 includes four six pulse bridges 22, labeled 22A, 22B, 22C, and 22D, with each diode bridge 22 being associated with a particular corresponding one of the secondary windings 12. FIG. 3 is a schematic diagram of each diode bridge 22 according to the exemplary embodiment. As seen in FIG. 3, diode bridge 22 includes six line frequency diodes 24 (labeled D1-D6), and six transistors 26 (labeled Q1-Q6) that are in anti-parallel connection with the line frequency diodes 24. In the exemplary embodiment, each transistor 26 is an IGBT having a respective gate that is structured to receive a respective gate signal generated as described herein during regeneration, although other electronic switching devices may also be used. For example, and without limitation, such other electronic switching devices include three or four layer devices such as High Voltage MOSFETs and BJTs, SCR Thyristors and Gate Commutated Thyristors (GCT, IGCT, SGCTs). These gate signals are labeled G1-G6 in the FIGS. Thus, regenerative rectifier 14 in the exemplary embodiment includes a total of twenty four line frequency diodes 24 and twenty four transistors 26, and is structured to receive a total of twenty four gate signals (labeled $G1_A$-$G6_A$, $G1_B$-$G6_B$, $G1_C$-$G6_C$ and $G1_D$-$G6_D$) for controlling the operation thereof in a regenerative condition.

Figure 4:
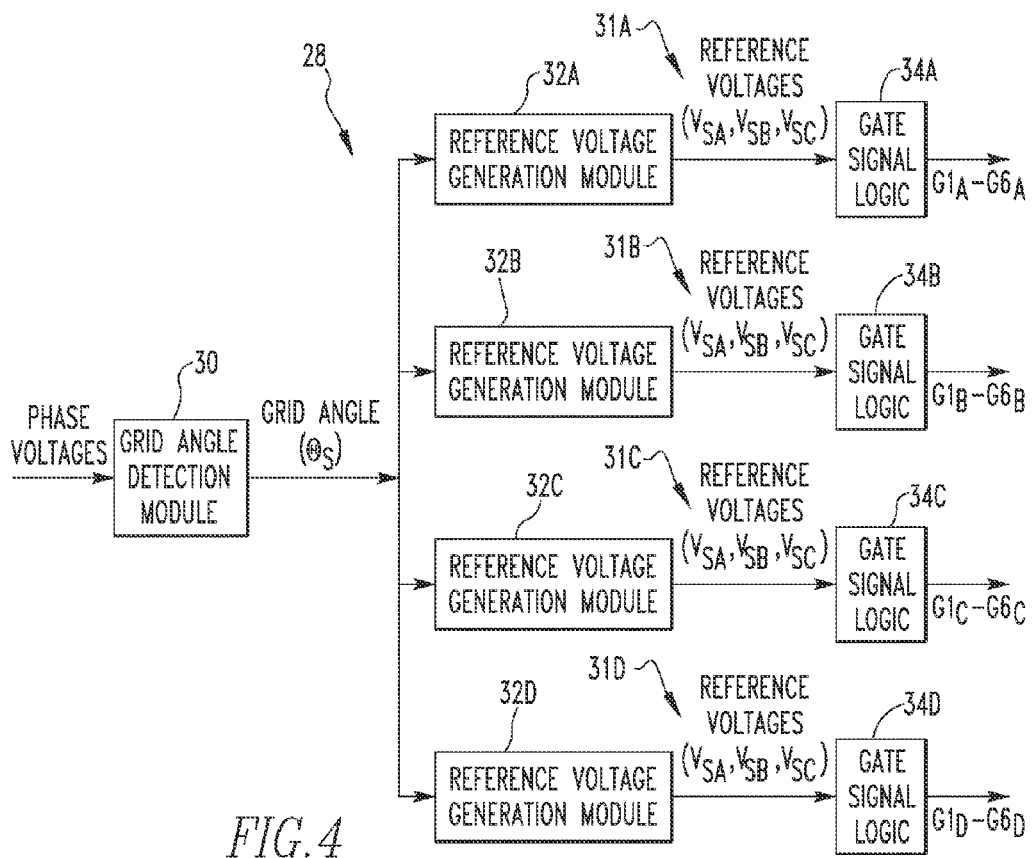
FIG. 4 is a block diagram of a gate signal generation module implemented in a controller of the regenerative rectifier of FIG. 2 according to the exemplary embodiment.

As noted elsewhere herein, controller 20 receives the upstream AC voltage signals from three phase AC source 4 and generates the gating signals that are provided to regenerative rectifier 14. FIG. 4 is a block diagram of a gate signal generation module 28 implemented in controller 20 to generate the gate signals G1-G6 for each diode bridge 22 (i.e., $G1_A$-$G6_A$, $G1_B$-$G6_B$, $G1_C$-$G6_C$ and $G1_D$-$G6_D$ in the exemplary embodiment).

Referring to FIG. 4, gate signal generation module 28 of the exemplary embodiment includes a grid angle generation module 30, and four separate (but identically structured) gate signal branches 31A, 31B, 31C, and 31D (described below) for creating the required twenty four gate signals $G1_A$-$G6_A$, $G1_B$-$G6_B$, $G1_C$-$G6_C$ and $G1_D$-$G6_D$, with each gate signal generation module 31 corresponding to one of the diode bridges 22. Each gate signal generation module 31 includes a reference voltage generation module 32 (labeled 32A-32D) and gate signal logic 34 (labeled 34A-34D). Each of these submodules is described in detail herein below. In short, grid angle generation module 30 receives as inputs the phase voltages from three phase AC source 4 and, as described herein, generates the repeating grid angle ($\theta_s$) of three phase AC source 4 using the phase voltages. Each reference voltage generation module 32 receives the grid angle ($\theta_s$) from grid angle generation module 30 and, as described herein, generates three reference voltages ($V_{SA}$, $V_{SB}$, $V_{SC}$) using the grid angle ($\theta_s$). Each gate signal logic 34 receives the reference voltages ($V_{SA}$, $V_{SB}$, $V_{SC}$) from its associated reference voltage generation module 32 and based thereon generates the gate signals G1-G6 for the associated diode bridge 22.

Figure 5:
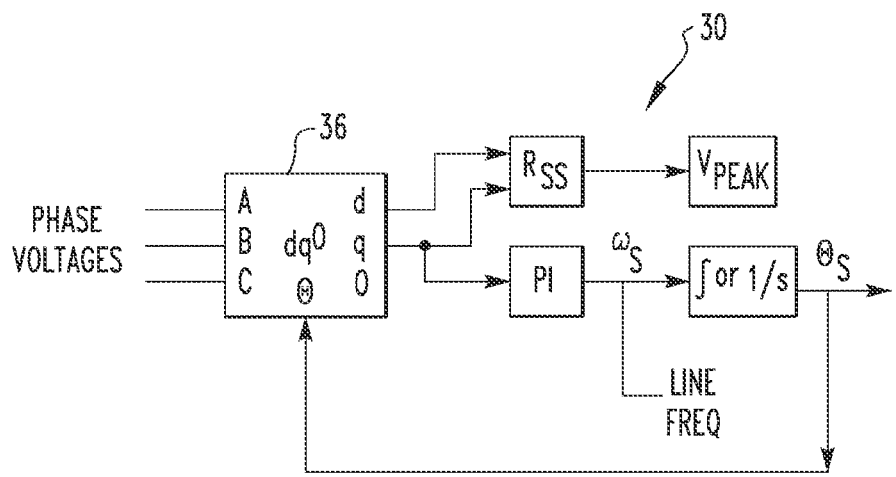
FIG. 5 is a schematic diagram illustrating implementation of a grid angle generation module of the gate signal generation module of FIG. 4 according to the exemplary embodiment.

FIG. 5 is a schematic diagram illustrating implementation of grid angle generation module 30 according to the exemplary embodiment. In grid angle generation module 30, a synchronous reference frame dq0 (direct-quadrature-zero) transformation, represented at 36, is performed on the phase voltages to generate and phase lock loop the grid angle ($\theta_s$) (using a proportional plus integral low-pass filter PI). In addition, as shown in FIG. 5, this transformation also reproduces the source frequency and input peak voltage (Root Sum Square, RSS of the d and q values of the transform).

Figure 6:
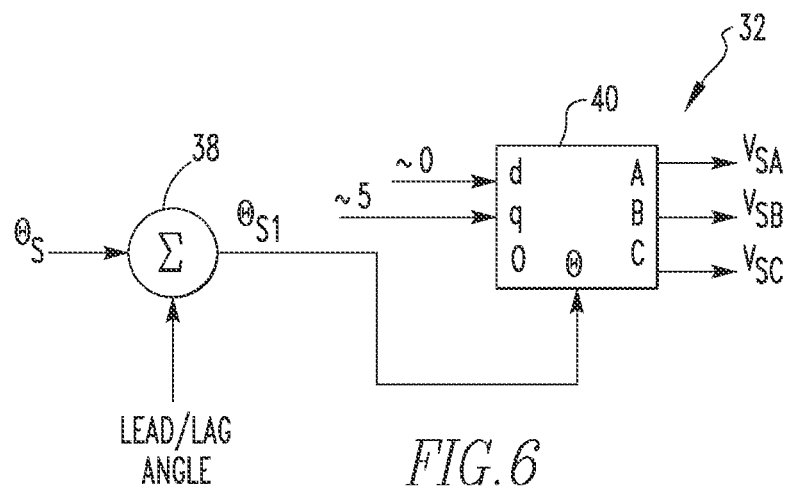
FIG. 6 is a schematic diagram illustrating implementation of a reference voltage generation module of the gate signal generation module of FIG. 4 according to the exemplary embodiment.

FIG. 6 is a schematic diagram illustrating implementation of reference voltage generation module 32 according to the exemplary embodiment. In reference voltage generation module 32, the calculated lead/lag angle (based on the transformer phase group) of the secondary winding 12 that is associated with and corresponds to the subject gate signal branch 31 (and therefore the associated diode bridge 22) of the reference voltage generation module 32 is added to/subtracted from the received grid angle ($\theta_s$) to produce an adjusted grid angle ($\theta_{s1}$) as shown at 38. A synchronous reference frame transformation back to the ABC frame, represented at 40, is then performed using the adjusted grid angle ($\theta_{s1}$) and control amplitude d and/or q, which transformation produces the reference voltages ($V_{SA}$, $V_{SB}$, $V_{SC}$) for the subject gate signal beach 31.

Figure 8:
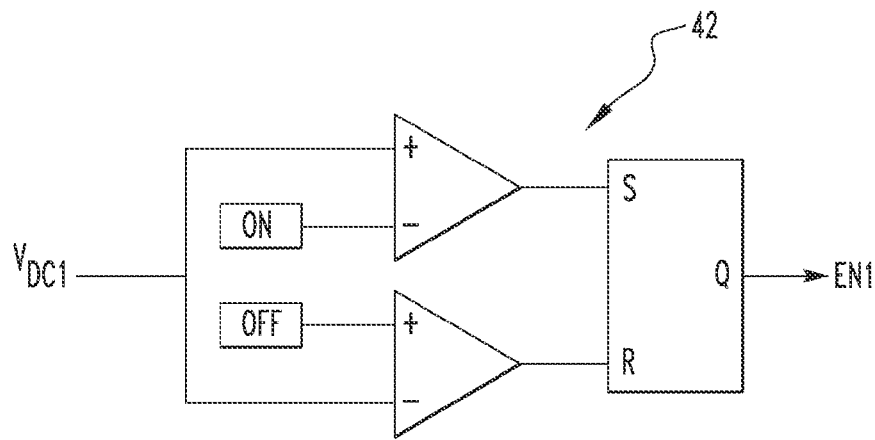
FIG. 8 is a schematic diagram illustrating implementation of an enable module implemented in the controller of the regenerative rectifier of FIG. 2 according to the exemplary embodiment.
Figure 7:
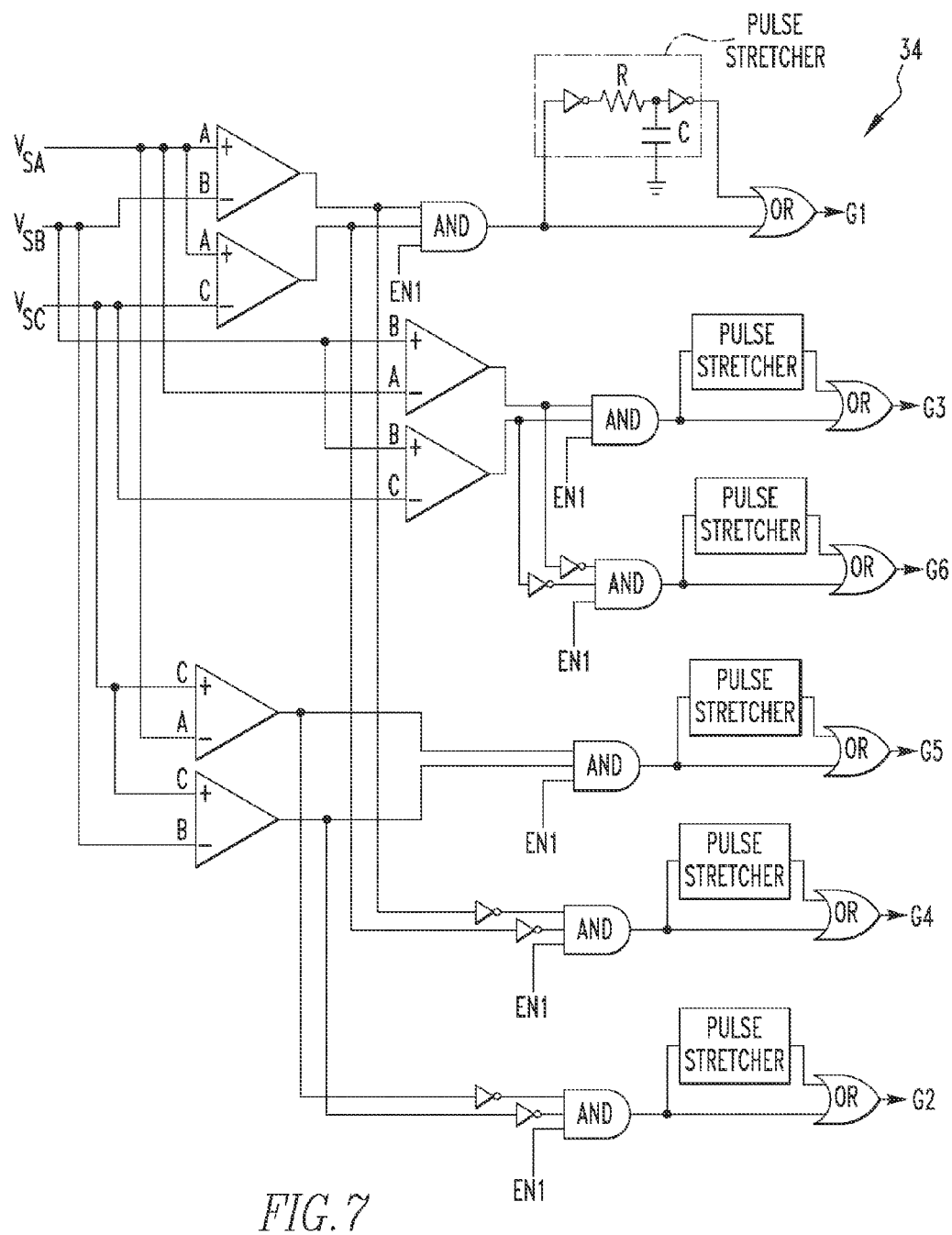
FIG. 7 is a schematic diagram illustrating implementation of the gate signal logic of the gate signal generation module of FIG. 4 according to the exemplary embodiment.

In each gate signal branch 31, the reference voltages ($V_{SA}$, $V_{SB}$, $V_{SC}$) are then provided to gate signal logic 34 of the gate signal branch 31, an exemplary embodiment of which is shown in FIG. 7. As seen in FIG. 7, gate signal logic 34 uses combinational logic and comparators to determine the proper ignition/extinction gating pattern and produce the gate signals G1-G6 for the subject gate signal branch 31 and diode bridge 22. As seen in FIG. 7, a pulse-stretcher circuit creates the necessary commutation overlap to prevent nuisance voltage notching. In the exemplary embodiment, as shown in FIG. 8, in an enable module 42 of controller 20, a DC bus comparison is made to predetermined hysteresis ON and OFF voltages through a SR-Flip Flop to enable the regeneration. These thresholds can be changed dynamically to compensate for how much power is processed.

The regeneration limit, negative power limit (and actual calculated motor power), and the hysteresis DC bus voltage values can be used along with the peak input voltage to allow for an online commutation overlap calculation. By compounding this information with the known secondary commutating reactance of transformer 8, a sensorless value of DC and AC side current can be roughly estimated. By use of an oscilloscope at the time of factory acceptance testing, these commutation overlap values can be calibrated/tuned prior to shipping VFD 2. Similarly, the peak voltage detected by the PLL in FIG. 5 can be used to determine whether the input voltage has increased to an unacceptable value. Otherwise, if this sensed input source voltage value is too low, the hysteresis settings in the DC bus set-reset flip-flop can be adjusted accordingly (likewise for either the regenerative torque or negative power limits in the motor controller). A more appreciable PLL or grid detection angle generator can be used to nullify any input voltage unbalance, notching and/or voltage distortion. Special consideration must be taken in selection of the transistors 26 for regeneration, and where possible a device without an intrinsic body diode or co-packaged fast recovery free-wheeling diode is preferred to complement the standard line frequency rectifier. If not, the forward voltage of the line frequency rectifier should be considerably less than the diode of the transistor.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A system for controlling a motor drive coupled to an AC power source in a condition wherein the motor drive is generating a regenerative current, comprising:
 a plurality of electronic switching devices structured to be provided in anti-parallel connection with a plurality of rectifier diodes of the motor drive; and
 a controller structured and configured to:
  receive a number of phase voltages from the AC power source;
  determine a grid angle for the AC power source using the number of phase voltages; and
  generate a number of control signals for controlling the electronic switching devices using the grid angle when the motor drive is generating the regenerative current.

2. The system according to claim 1, wherein the controller is structured and configured to determine the grid angle by performing a synchronous reference transformation using the phase voltages.

3. The system according to claim 2, wherein the synchronous reference transformation is a dq0 transformation.

4. The system according to claim 1, wherein the electronic switching devices are provided in a plurality of series connected diodes bridges, wherein the motor drive includes a transformer having a plurality of secondary windings, each of the diode bridges being associated with a respective one of the secondary windings, and wherein the generating the number of control signals comprises generating for each of the diodes bridges: (i) a plurality of reference voltages by performing a second synchronous reference transformation based on the grid angle, and (ii) a plurality of the control signals using the plurality of reference voltages.

5. The system according to claim 4, wherein for each of the diodes bridges, the generating a plurality of reference voltages by performing a second synchronous reference transformation also uses a lead/lag angle of the secondary winding that is associated with the diode bridge.

6. The system according to claim 5, wherein for each of the diodes bridges, the generating a plurality of reference voltages by performing a second synchronous reference transformation comprises creating an adjusted gird angle using the grid angle and the lead/lag angle and performing the second synchronous reference transformation using the adjusted grid angle.

7. The system according to claim 1, wherein the electronic switching devices are IGBTs and wherein the number of control signals are a number of gate signals for the IGBTs.

8. A regenerative variable frequency drive structured to be coupled to an AC power source, comprising:
 a plurality of rectifier diodes;
 a plurality of electronic switching devices provided in anti-parallel connection with the plurality of rectifier diodes; and
 a controller structured and configured to:
  receive a number of phase voltages from the AC power source;
  determine a grid angle for the AC power source using the number of phase voltages; and
  generate a number of control signals for controlling the electronic switching devices using the grid angle when the motor drive is generating a regenerative current.

9. A method for controlling a motor drive coupled to an AC power source in a condition wherein the motor drive is generating a regenerative current, comprising:
 receiving a number of phase voltages from the AC power source;
 determining a grid angle for the AC power source using the number of phase voltages; and
 generating a number of control signals for controlling a plurality of electronic switching devices provided in anti-parallel connection with a plurality of rectifier diodes of the motor drive using the grid angle when the motor drive is generating the regenerative current.

10. The method according to claim 9, wherein the determining the grid angle includes performing a synchronous reference transformation using the phase voltages.

11. The method according to claim 10, wherein the synchronous reference transformation is a dq0 transformation.

12. The method according to claim 9, wherein the electronic switching devices are provided in a plurality of series connected diodes bridges, wherein the motor drive includes a transformer having a plurality of secondary windings, each of the diode bridges being associated with a respective one of the secondary windings, and wherein the generating the number of control signals comprises generating for each of the diodes bridges: (i) a plurality of reference voltages by performing a second synchronous reference transformation based on the grid angle, and (ii) a plurality of the control signals using the plurality of reference voltages.

13. The method according to claim 12, wherein for each of the diodes bridges, the generating a plurality of reference voltages by performing a second synchronous reference transformation also uses a lead/lag angle of the secondary winding that is associated with the diode bridge.

14. The method according to claim 13, wherein for each of the diodes bridges, the generating a plurality of reference voltages by performing a second synchronous reference transformation comprises creating an adjusted gird angle using the grid angle and the lead/lag angle and performing the second synchronous reference transformation using the adjusted grid angle.

15. The method according to claim 9, wherein the electronic switching devices are IGBTs and wherein the number of control signals are a number of gate signals for the IGBTs.

* * * * *